United States Patent Office 3,254,137
Patented May 31, 1966

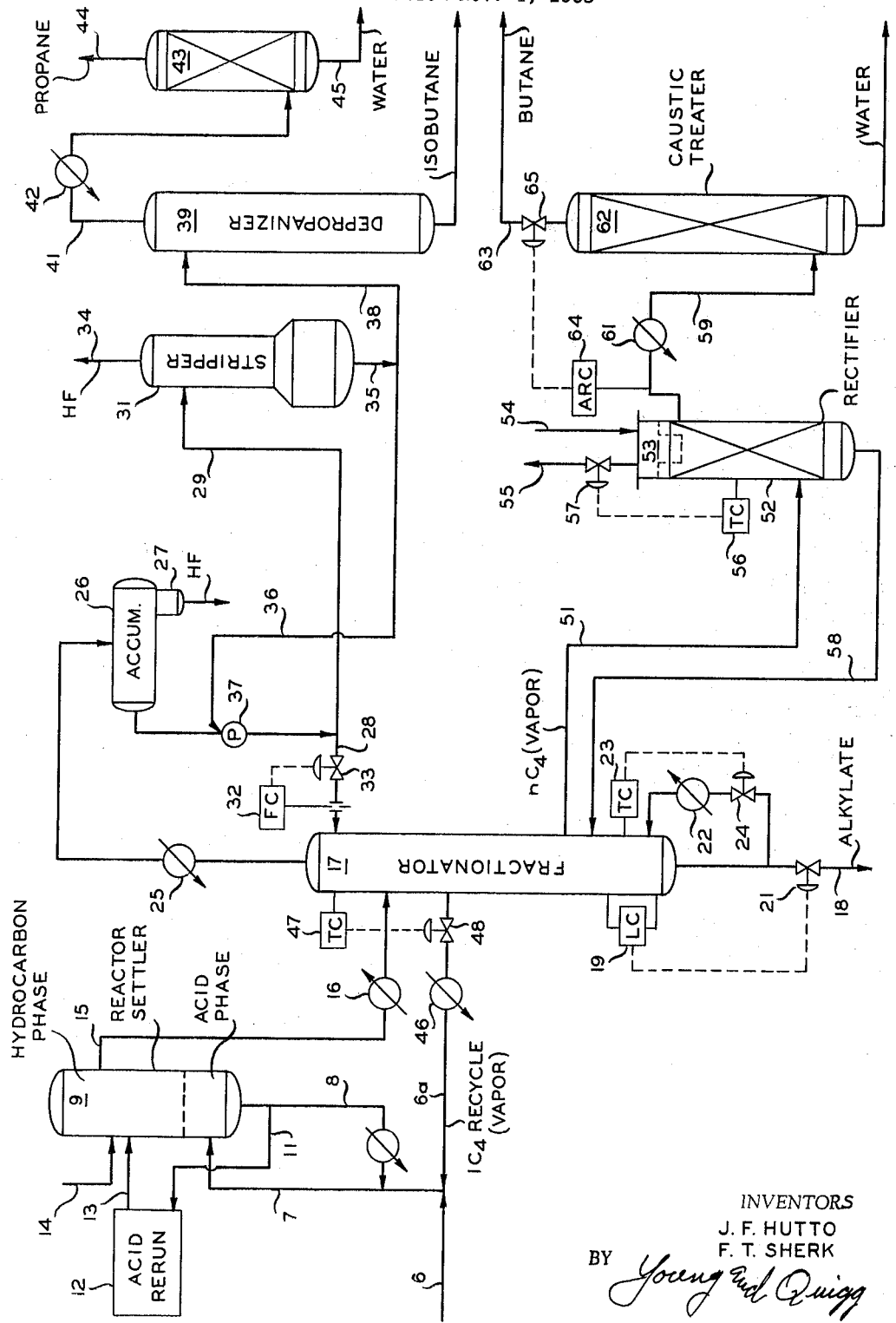

3,254,137
ALKYLATION REACTION PRODUCT SEPARATION
John F. Hutto and Fred T. Sherk, Bartlesville, Okla., assignors to Phillips Petroleum Company, a corporation of Delaware
Filed Nov. 4, 1963, Ser. No. 321,149
5 Claims. (Cl. 260—683.48)

This invention relates to an improvement in the separation of a mixture of materials resulting from a chemical reaction. In one of its aspects it relates to an improvement in the separation of the hydrocarbon effluent from an alkylation reaction. In still another aspect it relates to a method and means to recover a substantially fluoride-free butane product of relatively high purity from an HF alkylation reaction effluent without requiring a separate bubble tray distillation column for the separation.

In reactions involving hydrocarbons there inevitably occurs a mixture of hydrocarbons in the reactor effluent which usually requires separation for use or to be returned to the reaction. Such reactions can involve isomerization, polymerization, alkylation and disproportionation of relatively low-boiling hydrocarbons. In the alkylation of hydrocarbons, for example in the hydrogen fluoride alkylation of isobutane with an olefin, the hydrocarbon effluent from the reaction is usually fractionated stepwise in a series of bubble tray distillation columns. The products separated include alkylate, normal butane, isobutane, propane and hydrogen fluoride. It is customary to separate these materials individually, e.g., the alkylate product is removed as the kettle product in a first distillation step and normal butane and lighter materials are removed as overhead products and passed to a second distillation step where normal butane is removed as kettle product and isobutane and lighter materials are taken overhead to a third step wherein isobutane is removed as bottoms product and propane and lighter are removed as the overhead product and passed to a fourth step wherein propane is removed as bottoms product and lighter material, for example HF is removed as the overhead product. When more than two components having different boiling points are present in a liquid mixture, it is usually not feasible to attempt to obtain more than one component from the distillation step having a reasonable degree of purity. This is particularly true when the ratios of the components of the mixture are variable, i.e., subject to fluctuation. It is also essential that the products be substantially free from fluorides such as alkyl fluorides and hydrogen fluoride.

We have now discovered a method and means for recovering a substantially fluoride-free normal butane stream of high purity from the reaction effluent of the alkylation of isobutane with an olefin stream comprising butene and propylene without the necessity of recovering this butane stream in a step utilizing a separate bubble tray distillation column. In accordance with the practice of our invention the reaction effluent is fractionated in a bubble tray distillation column and a vapor stream rich in normal butane is withdrawn from the vapor space in the distillation column between bubble trays. The butane-rich vapor stream is passed to a relatively small vertical column packed with carbonaceous Raschig rings and equipped with an overhead condenser to provide reflux. A sufficient amount of reflux is provided to condense and liquefy pentanes and hydrocarbons boiling higher than pentanes. The condensate is returned to the bubble tray distillation column one or two trays below the point where the vapor stream is withdrawn. The butane stream withdrawn from the ring-packed column is condensed and passed upwardly through a treating tower packed with solid potassium hydroxide and thence to storage. In accordance with our invention the butane can be produced so that it contains not more than about 1 liquid volume percent pentane and heavier, not more than about 5 percent isobutane and is substantially free from fluorine compounds. The pentane and heavier content of the normal butane product is determined by the temperature maintained in the ring-packed column and this temperature is, in turn, controlled by the amount of cooling fluid passed through the overhead condenser of the packed column. The isobutane content of the normal butane product is controlled by the rate at which the vapor stream is withdrawn from the fractionator.

Feed streams to an alkylation reaction are seldom if ever composed of pure components. Thus, the isobutane feed to the alkylation reactor will often contain a variable amount of normal butane and the normal butane feed to the reactor will therefore vary. The isobutane which passes unreacted through the reactor will be returned to the reactor and ultimately will be consumed but the normal butane will be substantially unaffected by the reaction and will build up in the system, if not removed at substantially the same rate as it is fed to the reaction. The volume of normal butane removed from the bubble tray distillation column will be determined by the amount of normal butane present in the feed to the reactor and therefore the amount of butane removed from the bubble tray distillation column will vary as the butane content of the feed to the reactor varies. The amount of butane removed from the bubble tray distillation column can be controlled to maintain a substantially constant ratio of isobutane to normal butane so that the normal butane is removed from the distillation column in accordance with the amount of normal butane in the feed. The pentane content of the normal butane product will be determined by the temperature in the packed column as hereinbefore stated. Thus the packed column will be operated by maintaining the temperature required to maintain the ratio of pentane to normal butane within the predetermined range and by maintaining the amount of the butane-rich stream withdrawn so as to maintain the ratio of isobutane to normal butane within a predetermined range.

Removing the butane-rich vapor stream from the bubble tray distillation column provides a bottoms product in the bubble tray distillation column having a substantially constant boiling temperature so that the distillation column bottom can be maintained at a predetermined, substantially constant temperature. The upper portion of the column can also be maintained at a predetermined, substantially constant temperature and these two temperatures will be substantially independent of each other because removal of the variable quantity of normal butane from the column provides a mixture within the kettle of the bubble tray distillation column of substantially constant composition; and isobutane can then be removed from the upper portion of the column in an amount sufficient to maintain a substantially constant temperature at the top of the column so that the column overhead product composition is substantially constant.

It is an object of the invention to provide a method and means for product composition control in separating the effluent of a hydrocarbon reaction. It is also an object of the invention to provide a method and means for combining the steps of n-butane recovery and n-butane defluorination following an HF alkylation reaction. A further object is to provide a method and means for operating a fractional distillation so that at least 4 streams of controlled composition are recovered. Other and further objects and advantages of the invention will become apparent to those skilled in the art upon study of the disclosure including the detailed description of the invention and the appended drawing wherein:

The sole figure is a schematic flow sheet of a preferred embodiment of the invention.

A specific embodiment of an HF alkylation operation, according to the present invention, will now be described with reference to the drawing. An alkylatable hydrocarbon, such as propylene or butylene, or a mixture thereof, and an alkylating hydrocarbon such as isobutane admixed in suitable proportions are passed as fresh feed via conduit 6 and conduit 6a to conduit 7. HF catalyst is introduced into conduit 7 via conduit 8. As the acid catalyst and hydrocarbon reactants come into contact, reaction between the olefin and isoparaffin occurs. Within a very short period of time, usually in the order of 0.1 to 30 seconds, the alkylation reaction is completed, after which the reaction effluent passes from conduit 7 into phase separation vessel 9. A portion of the acid phase from vessel 9 is passed via conduit 11 to acid rerun unit 12 wherein the acid is reclaimed and returned to vessel 9 via conduit 13 at a point above the entrance of conduit 7 to vessel 9. Fresh acid is added to vessel 9 via conduit 14 at a point above the entry of conduit 13 to vessel 9. The reaction product, having been treated with increments of HF acid of increasing purity, is substantially depleted of alkyl fluorides by breaking these fluorides down to form additional alkylate and to liberate HF acid. The hydrocarbon reaction product containing alkylate, dissolved HF and unreacted paraffin hydrocarbon, is removed from vessel 9 via conduit 15, heated in heater 16 and passed into fractionator 17 which can be a bubble tray distillation column.

The kettle product from fractionator 17, comprising alkylate, is withdrawn via conduit 18. The quantity of kettle bottoms removed from fractionator 17 is controlled by liquid level control 19 which actuates motor valve 21 in conduit 18. A quantity of liquid is removed from conduit 18 and passed through reboiler 22 and returned to the bottom of fractionator 17. The quantity of kettle bottoms which is reboiled and returned to the fractionator is controlled by temperature controller 23 which actuates motor valve 24 to control the flow through the reboiler 22.

The overhead product from fractionator 17 is cooled and condensed in cooler 25 and passed to accumulator 26. Liquid HF forms a separate liquid phase in the bottom of accumulator 26 and is withdrawn via conduit 27 and returned to the reactor-settler 9 via conduit 14. Liquid hydrocarbon is withdrawn from accumulator 26, a portion being returned to the top of fractionator 17 via conduit 28 as reflux and another portion being passed via conduit 29 as feed to HF stripper 31. The quantity of reflux returned to the top of fractionator 17 will be determined by flow controller 32 which actuates motor valve 33 and the remainder of the hydrocarbon removed from accumulator 26 will be passed as feed to stripper 31. Stripper 31 removes HF from the hydrocarbons and the HF is removed via conduit 34 and is returned to reactor-settler 9 via conduit 14. Substantially HF-free hydrocarbon comprising a mixture of isobutane and propane is withdrawn from stripper 31 via conduit 35. A portion of the hydrocarbon in conduit 35 is passed via conduit 36 as pump flush to prevent leakage of HF from pump 37. The remainder of the hydrocarbon in conduit 35 is passed via conduit 38 to depropanizer 39. Isobutane is withdrawn from the bottom of depropanizer 39 and is returned to conduit 6. Propane is removed overhead from depropanizer 39 via conduit 41, condensed in cooler 42 and contacted with solid KOH in caustic treater 43 and recovered via conduit 44. Water is removed from the bottom of caustic treater 43 via conduit 45.

A vapor stream is removed from fractionator 17 from between trays at a point of high isobutane concentration in the vapor phase via conduit 6a, is condensed in cooler 46 and introduced along with the stream in conduit 6 to the reactor conduit 7. The quantity of recycle isobutane vapor removed from fractionator 17 is controlled by temperature controller 47 which actuates motor valve 48. The isobutane recycle stream is withdrawn at a rate such that the top of fractionator 17 is maintained at a substantially constant temperature so that the composition of the materials removed from fractionator 17 and passed to accumulator 26 is substantially constant.

A vapor stream rich in normal butane is withdrawn from between trays in fractionator 17 at a point of high normal butane concentration and passed via conduit 51 to rectifier 52 which is a vertical vessel packed with solid carbonaceous packing material such as Raschig rings, Berl saddles, and the like. A reflux condenser 53 is positioned in the top of rectifier 52 and is supplied with a coolant, e.g., water, via conduit 54. Coolant is removed from condenser 53 via conduit 55. Temperature controller 56 actuates motor valve 57 in conduit 55 to control the temperature in rectifier 52 at a predetermined level. Liquid is withdrawn from the bottom of rectifier 52 and passed via conduit 58 to fractionator 17 at a point below the vapor withdrawal conduit 51. A vapor stream, comprising normal butane with small amounts of isobutane and pentane and higher hydrocarbons, is withdrawn from the top of rectifier 52 via conduit 59, cooled and condensed in cooler 61 and passed to caustic treater 62 which is packed with lumps of solid KOH. Butane product is withdrawn from the top of caustic treater 62 via conduit 63. The quantity of butane-rich vapor withdrawn from fractionator 17 is controlled by analyzer controller 64 which actuates motor valve 65 in conduit 63.

The relationship of streams pertinent to the invention are shown in the following tabulation. The table does not represent a material balance because some streams are not included. For example, the propane present in the overhead stream from the HF stripper is not shown. Other streams not necessary for an understanding of the invention are not shown.

*Volumes of liquid per unit of time*

| Conduit number | 7 | 15 | 18 | 63 | 44 | 6a | 51 |
|---|---|---|---|---|---|---|---|
| Conduit designation | Reactor feed | Fractionator feed | Alkylate product | Normal butane product | Propane product | Isobutane recycle | n-Butane withdrawal |
| HF | 2.5 | 125.9 | | | | 2.5 | |
| Propylene | 139.1 | | | | | | |
| Propane | 1,724.8 | 1,775.7 | | | 340.0 | 1,360.9 | |
| Isobutane | 14,805.0 | 13,766.4 | 0.8 | 22.8 | 4.5 | 12,778.9 | 35.9 |
| Butylenes | 999.7 | | | | | | |
| Normal butane | 3,437.3 | 3,504.1 | 71.9 | 401.1 | | 2,897.6 | 574.6 |
| Pentanes+ | 385.7 | 2,408.8 | 2,074.4 | 4.8 | | 322.3 | 138.5 |
| Totals | 21,494.1 | 21,580.9 | 2,147.1 | 428.7 | 344.5 | 17,362.2 | 749.0 |

The KOH treated propane product contains about 13 to 25 p.p.m. of alkyl fluorides by weight. The KOH treated n-butane product contains about 5 to 25 p.p.m. of alkyl fluorides by weight. The fluoride content of the propane stream is low because the amount of propylene in the feed is small. The fluoride content of the n-butane product is about one-half that of the n-butane stream withdrawn from the fractionator 17.

The KOH in the caustic scrubbers 43 and 62 is in the form of lumps of random size. We have found the solid KOH to be superior to NaOH for our purpose because the lumps of solid KOH are self-cleaning, i.e., the reaction product of HF and KOH sloughs off the surface as it is formed so that a fresh surface is always presented to the fluid entering the scrubber.

The packing material in rectifier 52 can be any solid contact material that is not adversely affected by HF. Materials are preferred that catalyze the defluorination of organic fluorides such as alkyl fluorides. Such materials include carbon, aluminum, bauxite and and other known solid defluorination catalysts. The contact material can be in the form of rings, cubes, spheres, natural lumps and other forms suitable for packing a column to provide high contact with low pressure drop through the column.

That which is claimed is:

1. In a process wherein an alkylatable hydrocarbon and an alkylating hydrocarbon are reacted in the presence of HF and the reaction effluent hydrocarbon phase of variable composition is separated into alkylate, n-butane and propane product streams, the improvement comprising, distilling said hydrocarbon phase in a single distillation column;
removing alkylate from the bottom of said distillation column at a substantially constant temperature;
removing propane and lighter materials from the top of said distillation column at a substantially constant temperature;
removing an isobutane-rich vapor stream from said distillation column at a point of high isobutane concentration in an amount sufficient to maintain a substantially constant temperature in the top of said distillation column;
and removing a n-butane-rich vapor stream from said distillation column at a point of high n-butane concentration in an amount sufficient to maintain a substantially constant ratio of isobutane to n-butane in the n-butane-rich stream.

2. The process of claim 1 wherein the n-butane-rich vapor stream is passed upwardly through a rectifying zone in contact with a solid carbonaceous defluorination catalyst at a temperature such that pentanes and heavier materials are condensed; the temperature in the rectifying zone is maintained at a predetermined level by indirect heat exchange with a cooling fluid; condensate is returned to the distillation zone; and n-butane vapor is removed from the rectifying zone.

3. The process of claim 2 wherein the isobutane concentration of the n-butane-rich vapor stream withdrawn from the rectifying zone is determined, and the flow of vapor from the rectifying zone is regulated to maintain the isobutane concentration of the vapor stream within a predetermined range.

4. In an HF catalyzed reaction wherein $C_4$ organic compounds are treated with HF in a reaction zone and an organic fluoride is formed as an impurity in the n-butane by-product recovered from the reaction zone, the improvement comprising:

passing the effluent from the reaction zone to a single distillation column wherein propane and lighter is removed overhead and pentanes and heavier are removed as kettle product;
removing a n-butane-rich vapor stream from said distillation column;
passing said stream into contact with a solid carbonaceous defluorination catalyst in a rectifying zone;
reducing the temperature in the rectifying zone by indirect heat exchange with a cooling fluid so as to condense $C_5+$ hydrocarbons;
returning liquid from said rectifying zone to said distillation column;
removing vapor comprising n-butane from said rectifying zone;
condensing said vapor;
contacting said vapor with solid KOH; and
recovering a substantially HF-free n-butane product.

5. The process of claim 4 wherein the amount of n-butane-rich vapor stream removed from said distillation column is controlled to maintain a predetermined ratio of n-butane to isobutane in the stream withdrawn.

References Cited by the Examiner

UNITED STATES PATENTS

| | | | |
|---|---|---|---|
| 2,377,546 | 6/1945 | Frey | 260—683.41 X |
| 2,377,736 | 6/1945 | White | 202—154 X |
| 2,764,623 | 9/1956 | Leonard et al. | 260—683.48 |
| 2,769,853 | 11/1956 | Hettick | 260—683.42 |
| 2,974,182 | 3/1961 | Van Pool | 260—683.42 |
| 3,002,818 | 10/1961 | Berger | 260—683.48 |

OTHER REFERENCES

Hengstebeck: Distillation, Reinhold, N.Y., 1961, pp. 148–151.

DELBERT E. GANTZ, *Primary Examiner.*

PAUL M. COUGHLAN, *Examiner.*

R. H. SHUBERT, *Assistant Examiner.*